United States Patent
Fillit (10) Patent No.: US 11,152,815 B2
(45) Date of Patent: Oct. 19, 2021

(54) SOLAR HOME SYSTEM FOR ALL HOUSEHOLD SERVICES

(71) Applicant: Marielle Damara Fillit, Bal Harbour, FL (US)

(72) Inventor: Marielle Damara Fillit, Bal Harbour, FL (US)

(73) Assignee: THE KGS GROUP LLC, North Miami, FL (US)

( * ) Notice: Subject to any disclaimer, the term of this patent is extended or adjusted under 35 U.S.C. 154(b) by 157 days.

(21) Appl. No.: 16/692,442

(22) Filed: Nov. 22, 2019

(65) Prior Publication Data

US 2020/0091760 A1  Mar. 19, 2020

Related U.S. Application Data

(63) Continuation of application No. 15/635,215, filed on Jun. 28, 2017, now abandoned, which is a continuation of application No. PCT/US2015/067901, filed on Dec. 29, 2015.

(60) Provisional application No. 62/097,371, filed on Dec. 29, 2014.

(51) Int. Cl.
*H02J 7/00* (2006.01)
*H02J 7/35* (2006.01)
*H02J 4/00* (2006.01)
*H02S 40/32* (2014.01)

(52) U.S. Cl.
CPC .............. *H02J 7/35* (2013.01); *H02J 4/00* (2013.01); *H02J 7/00036* (2020.01); *H02S 40/32* (2014.12)

(58) Field of Classification Search
USPC .......................................................... 320/134
See application file for complete search history.

(56) References Cited

U.S. PATENT DOCUMENTS

| | | | | |
|---|---|---|---|---|
| 5,969,529 A * | 10/1999 | Eiraku | ............... | G01R 31/3648 320/136 |
| 6,184,656 B1 * | 2/2001 | Karunasiri | ............. | B60L 58/27 320/119 |
| 8,850,468 B2 * | 9/2014 | Koplar | ............... | H04N 7/17318 725/24 |
| 8,952,824 B2 * | 2/2015 | Drimusz | .................. | H04R 5/02 340/636.2 |
| 2010/0073202 A1 * | 3/2010 | Mazed | .................... | G06F 1/166 340/999 |
| 2011/0010043 A1 * | 1/2011 | Lafky | .................... | B60L 53/18 701/31.4 |
| 2011/0156640 A1 * | 6/2011 | Moshfeghi | .............. | H02J 7/025 320/108 |
| 2011/0191026 A1 * | 8/2011 | Moon | .................... | H04H 60/71 702/3 |

(Continued)

*Primary Examiner* — Alexis B Pacheco
(74) *Attorney, Agent, or Firm* — Trueba & Suarez PLLC; Roberto M. Suarez; William R. Trueba, Jr.

(57) ABSTRACT

The disclosure describes a solar home system that may be used for the following purposes in the household: lighting, mobile phone and other electronic device charging through Universal Serial Bus (USB) ports, receiving television signal through digital TV signal, receiving internet information through the wireless network signal and powering electronics through an inverter. The present invention is very beneficial for households who do not have access to electricity from the electricity grid, households that have unreliable access to electricity, or households that choose not to utilize electricity directly from the grid.

16 Claims, 4 Drawing Sheets

(56) References Cited

U.S. PATENT DOCUMENTS

2013/0285605 A1\* 10/2013 Partovi ................ H04B 5/0081
  320/108
2014/0368476 A1\* 12/2014 Rauch .................... A47B 21/06
  345/204

\* cited by examiner

SOLAR HOME SYSTEM FOR ALL HOUSEHOLD SERVICES

CROSS-REFERENCE TO RELATED APPLICATIONS

This application is a Continuation of, and claims priority to, pending U.S. patent application Ser. No. 15/635,215, filed on Jun. 28, 2017, which application claims priority to PCT application serial number PCT/US15/67901, filed 29 Dec. 2015, which claims priority to U.S. Provisional Patent Application Ser. No. 62/097,371, filed Dec. 29, 2014, the entire contents of which are incorporated herein by reference.

FIELD OF THE INVENTION

In embodiments, the technical field of the invention is electronic devices and solar home electronic systems.

BACKGROUND

Current solar home system machines generally provide lighting and charging services. People without access to electricity are unable to take advantage of other services (e.g., device charging, television, Internet, etc.) through these current solar home systems.

There is a need for a solar home system that can be used as an all-in-one system to provide a wider variety of services, either for people that do not have access to electricity, or those that do not have continuous access. There is a need for a system and method which could produce light, charge electronic devices, provide current to electrical appliances, and use and provide television and internet services, all while maintaining the off-grid nature of the house or workplace.

SUMMARY OF THE INVENTION

In an aspect, the present invention relates to a solar home system machine that generates and provides electrical current for electrical devices, operates a built-in television, provides lighting, provides mobile phone charging, and provides internet services through a built-in computer. The present invention will be very useful for people that do not have access to electricity from an electricity grid, people that have unreliable electricity access, or people that choose not to utilize electricity directly from the grid.

In an aspect, the present invention is a solar home system that is used for the following main household purposes: lighting, mobile phone and other electronic device charging through Universal Serial Bus (USB) ports, receiving television signals via a digital and/or analog TV signal, receiving internet information through the wireless network signal, and powering electronics through an inverter.

In an aspect, the primary mechanism of the solar home system is to generate electrical current from the solar panels, and to use that electrical current to either charge a battery that stores the energy, or to use the energy to perform the services mentioned herein.

In an aspect is a solar home system comprising: a solar panel; a battery configured to be charged by the solar panel; a power distribution module configured to receive and distribute DC supplied from the battery to a DC/AC inverter, an integrated computer with a touchscreen display, an integrated speaker, an integrated USB port, an integrated light port, and a communication module comprising a data element and a TV element, wherein: the TV element comprises an integrated digital TV signal decoder or is configured to interface with a mobile digital TV signal decoder; the data element is configured to receive and transmit data; the touchscreen is configured to display images received by the communications module; and the DC/AC inverter is configured to supply AC to an integrated outlet. In embodiments:

the communication module comprises an integrated digital TV signal decoder;

the communication module is configured to interface with a mobile digital TV signal decoder;

the communication module comprises an integrated digital TV signal decoder, and wherein the data element is configured to access the Internet via a mobile data network;

the data element is configured to receive and transmit data via a network;

the data element is configured to receive and transmit data via a mobile data network;

the data element is configured to receive and transmit data via a network other than a mobile data network;

the touchscreen is configured to receive user input and transfer the user input to the communication module;

the touchscreen is configured to display images received from the USB port when a device is interfaced with the USB port;

the power distribution module comprises a motherboard;

the power distribution module comprises a motherboard, the motherboard comprising a processor and a memory coupled to the processor, the memory comprising program instructions configured to instruct the processor to manage power distribution by the power distribution module;

further comprising a housing, wherein the integrated speaker, integrated USB port, and integrated outlet are disposed on the surface of the housing;

the touchscreen is configured to receive user input and transfer the user input to the communication module, and wherein the communication module is configured to transmit the user input via the data network to an Internet host;

further comprising a camera for taking photos and videos of a user, wherein the communications module is configured to interface with the camera and provide video teleconferencing;

the battery and the power distribution module are configured to be turned off remotely when a signal is sent to the solar home system via the data element;

further comprising an external antenna connected to the communications module and configured to amplify the signal received by the digital TV signal decoder; and the communication module comprises an integrated digital TV signal decoder, and wherein the touchscreen is configured to display a TV signal received by the TV signal decoder.

In an aspect is a method for displaying a TV signal, the method comprising receiving the TV signal with the solar home system as above and displaying the received TV signal on the touchscreen.

In an aspect is a solar home system comprising of: solar panel that charges the battery of the solar home system; the motherboard of the solar home system that distributes DC power to the light ports, USB ports, speakers, touchscreen and inverter; a built in inverter that creates AC electricity for various kinds of electrical devices; a touchscreen through which television and internet services can be operated in the household; and speakers that project the audio. In embodiments:

the solar home system as above, providing various services to people such as: lighting, mobile phone and other electrical device charging through Universal Serial Bus (USB), receiving television signal through digital TV signal, receiving internet information through the wireless network signal and powering electronics through an inverter; and the solar system as above, having the capability to maintain the off the grid of the household by allowing the household to generate its own renewable energy.

It is the objective of the invention to benefit households that do not have access to electricity from an electricity grid, households that have unreliable access to electricity, or households that choose not to utilize electricity from the grid. This objective will be accomplished by providing access to electrical services in the household like lighting, electrical device charging, electrical current for devices, and television and internet services.

Another objective of the invention is to maintain the off-grid nature of the household by allowing the household to generate its own renewable energy, and to use no carbon in the generation of electricity for the energy needs of the household.

It is also the objective of the invention to provide information services to the household by providing a solar home system that can receive and display digital and/or analog television signals, as well as provide an internet signal via a wireless network. These television and internet signals will be displayed in both an audial and visual way.

These and other features, objects and advantages of the present invention will be readily apparent to those reading the entirety of this disclosure, which includes the accompanying drawings and claims.

DETAILED DESCRIPTION OF VARIOUS EMBODIMENTS

In an aspect is a solar home system comprising: a solar panel; a battery configured to be charged by the solar panel; a power distribution module configured to receive and distribute DC supplied from the battery to a DC/AC inverter, an integrated computer with a touchscreen display, an integrated speaker, an integrated USB port, an integrated light port, and a communication module comprising a data element and a TV element, wherein: the TV element comprises an integrated digital TV signal decoder or is configured to interface with a mobile digital TV signal decoder; the data element is configured to receive and transmit data via a mobile data network; the touchscreen is configured to display images received by the communications module; and the DC/AC inverter is configured to supply AC to an integrated outlet.

In embodiments, the system comprises a battery and a solar panel. The battery is of a size and capacity that is sufficient to provide power for the system components (computer, display, etc.) for a desired period of time—such as a running time between 1-12 hours, or at least 1, 2, 3, 4, 5, or 6 hours of continuous use. Such running time can be for one component, multiple components, or all components present on the system running concurrently. The physical size of the battery and the charge capacity are variables that can be optimized depending on the intended use and user, and such optimization is routine and within the skill in the art. The battery may be any rechargeable variety, such as NiMH, lithium ion, or the like. The solar panel will be of a size that is sufficient to charge the selected battery in a desired amount of time, such as within 1, 2, 3, 4, or 5 hours.

In electrical communication with the battery is a power distribution module. In embodiments, the function of the power distribution module is to ensure that power from the battery is appropriately distributed among the various system components. Components in use receive the power they need to function, while components not in use or in standby mode receive power appropriately. In embodiments, the power distribution module comprises a motherboard, which may comprise a processor and a memory with program instructions sufficient to cause the power distribution module to carry out its intended function. All electrical components of the device are indirectly connected to the battery via the power distribution module.

The device further comprises a computer. The computer functions to control the operation and interoperation of the various components on the device. For example, the computer determines which component is connected to the display (described herein), what information is stored in the memory, and other operations and interoperations. In embodiments, the computer comprises a motherboard, which may comprise a processor and a memory with program instructions sufficient to cause the computer to carry out its intended function.

In embodiments, the device comprises a speaker. The device may comprise a plurality of speakers, such as 2, 3, 4, or more than 4 speakers. Various types of speakers may be present such as a woofer, sub-woofer, tweeter, or any combination thereof. The speakers are configured to deliver any audio component of audio-visual content received and/or displayed by the device. The speakers may be configured for stereo operation or mono operation. The speaker is integrated into the device meaning that it may be entirely within the device housing or, alternatively, may be integrated into a wall of the device housing.

In embodiments, the device comprises a lighting port. The lighting port provides a port for a light that can be used by the user. The lighting port is integrated with the device housing and allows the user to plug in one or more lights. More than one lighting port may be present on the device, such as 2, 3, 4, or more than 4 lighting ports. In embodiments, the lighting port is in communication with the power distribution module in order to receive DC. In embodiment, the lighting port is in communication with the inverter (described herein) in order to receive AC. Any appropriate connector may be used for the lighting port. In embodiments, the lighting port lacks any connectors, but instead comprises a non-removable wire directly integrated into the device, traversing through a wall of the device housing and directly connecting to the power distribution module. The terminus of such wire is any desirable light such as an LED or other light source.

In embodiments, the device comprises an AC outlet. The AC outlet (also referred to herein as an "outlet") is integrated into the device and, in embodiments, is disposed in a wall of the device housing such that a user can plug an external device into the outlet. The AC outlet provides 120V, 220V, 240V AC, or any other AC voltage as appropriate for the location that the device will be used, and such AC is supplied by an inverter that is in electrical communication with the battery. The inverter is integrated into the device and is connected to the power distribution module.

The device comprises a USB port. The device may comprise more than one, such as 2, 3, 4, or more than 4 USB ports. Alternatively or in addition, the device may comprise other I/O ports, such as HDMI, USB Type-C, or the like, including future-developed I/O ports. In embodiments the USB port receives power from the power distribution module. In embodiments, the USB port is in communication with the computer such that an external device connected to the USB port can be accessed by the computer and can therefore access other components of the device (e.g., the touchscreen, etc.). The USB port is integrated into the device and may be disposed in a wall of the device housing.

The device comprises a touchscreen display (also referred to herein as a "display" or a "touchscreen"). The touchscreen display is integrated into the device and may be mounted directly into a wall of the device housing or may be mounted on a swivel arm or other form of bracket/support. The touchscreen may be any suitable/desirable size, such as in the range of 5-30, or 10-20 inches (measured on the diagonal), or such as greater than or equal to 5, 8, 10, 12, 15, or 20 inches. The touchscreen receives power from the power distribution module. The touchscreen is connected to the device computer such that the touchscreen can function as an input/output (I/O) device for the computer. The touchscreen is also connected to the USB port (directly or via the computer, as appropriate) such that content present in a device connected to the USB port can be displayed on the touchscreen. User input via the touchscreen can be used to control the device and the various components of the device. In embodiments, the touchscreen is configured to receive user input and transfer the user input to the communication module.

The device comprises a communications module. The communications module comprises a data element and a TV element, and is in communication with the computer in order to manage information sent and received by the communications module. The communications module is further connected to the power distribution module in order to receive power as appropriate. Information received by the communications module may be displayed on the touchscreen display, stored in the computer memory, transferred to an external device connected to the USB port, etc., as appropriate.

In embodiment, the data element of the communications module is configured to receive and transmit data via a network such as a mobile data network or any other data-enabled network. In embodiments, the mobile data network is selected from RF, WiFi, 3G, 4G, Li-Fi, LTE, WLAN, WiMAX, Bluetooth, and wireless mesh. In embodiments the data element comprises a SIM and is configured to communicate with a cellular network. In embodiments, the data element is configured to receive and transmit one or more types of data selected from telephony, Internet traffic, and SMS. In embodiments, the communication module is configured to transmit user input (received, e.g., via the touchscreen) via the data network to an Internet host. In embodiments, the data element is configured to access the Internet via the data network.

The TV element comprises an integrated digital TV signal decoder or is configured to interface with a mobile digital TV signal decoder. The touchscreen is configured to display a TV signal received by the TV element, whether the TV element is integrated or configured to interface with a mobile decoder. In embodiments, the device comprises more than one TV decoder, such as a decoder for free-to-air channels and a decoder for pay-for-access channels, or the like. The device may comprise a plurality of TV decoders, as necessary, or be configured to contain a decoder and interface separately with a mobile decoder.

In embodiments, the TV element comprises an integrated digital TV signal decoder. In such embodiments, the decoder is factory installed or otherwise present within the housing. The decoder can be any suitable decoder capable of receiving a coded TV signal and sending the decoded signal to the touchscreen for display. A variety of decoder devices are known and are commercially available and will be suitable. In embodiments, the TV element is a set-top-box motherboard with an integrated decoder chip.

In embodiments, where possible, the TV decoder may also provide Internet access.

In embodiments, the TV element is configured to interface with a mobile digital TV signal decoder. The interface may be any suitable interface now known or later developed, with examples including the following: a USB interface, a PC Card interface, an HDMI interface, an RCA interface, an SDI interface, and a VGA interface. Example mobile TV decoder devices include dongles, PC Cards, and the like. In embodiments, the TV element comprises a USB connector configured to receive a dongle with a SIM. In embodiments, the TV element is a PC Card interface configured to receive a Conditional Access Module (CAM) card.

In embodiments, the device comprises a camera. The camera is positioned and configured for taking photos and videos of the user. With such a configuration, and by connecting the camera to the communications module, the device can be used to provide video teleconferencing. A microphone may also be present to aid such embodiments. The camera and microphone can be integrated with the device although in other embodiments these components can be peripheral components that interface with the device.

As mentioned throughout, the device comprises a housing, wherein the housing comprises walls and provides a structure for the device. The housing can be any convenient shape and size provided that the necessary components fit within the housing and the necessary ports can be disposed on the walls of the housing.

In embodiments the device comprises an antenna. The antenna may be internal or external. A plurality of antennas may be present (2, 3, etc.) if necessary to receive various signals (e.g., TV signals, WiFi, etc.), or a single antenna can be used for all signals. The antenna is connected to the communications module.

The device may further comprise encryption and other security features as desired. In an embodiment, the battery and the power distribution module are configured to be turned off remotely when a signal is sent to the solar home system via the data element. This provides the manufacturer the ability to turn the solar home system off, rendering it useless, for example if a customer is not paying monthly bills to finance the system. For example, using a pay-as-you-go technology a provider can send a signal to the SIM card, and the device's computer will utilize internal circuitry to turn off the battery so that the user cannot use the machine when they don't pay their bill. Power may be disconnected from the battery or, alternatively, from the power distribution module. Other mechanisms for disabling the device are also possible.

The disclosure above mentions several motherboards carrying out varying operations (e.g., for the power distribution module and the computer), although in embodiments all such functions can be carried out with a single motherboard. In such embodiments the internal circuitry is configured to ensure that the functions are properly carried out and separated as necessary.

Figure 1:
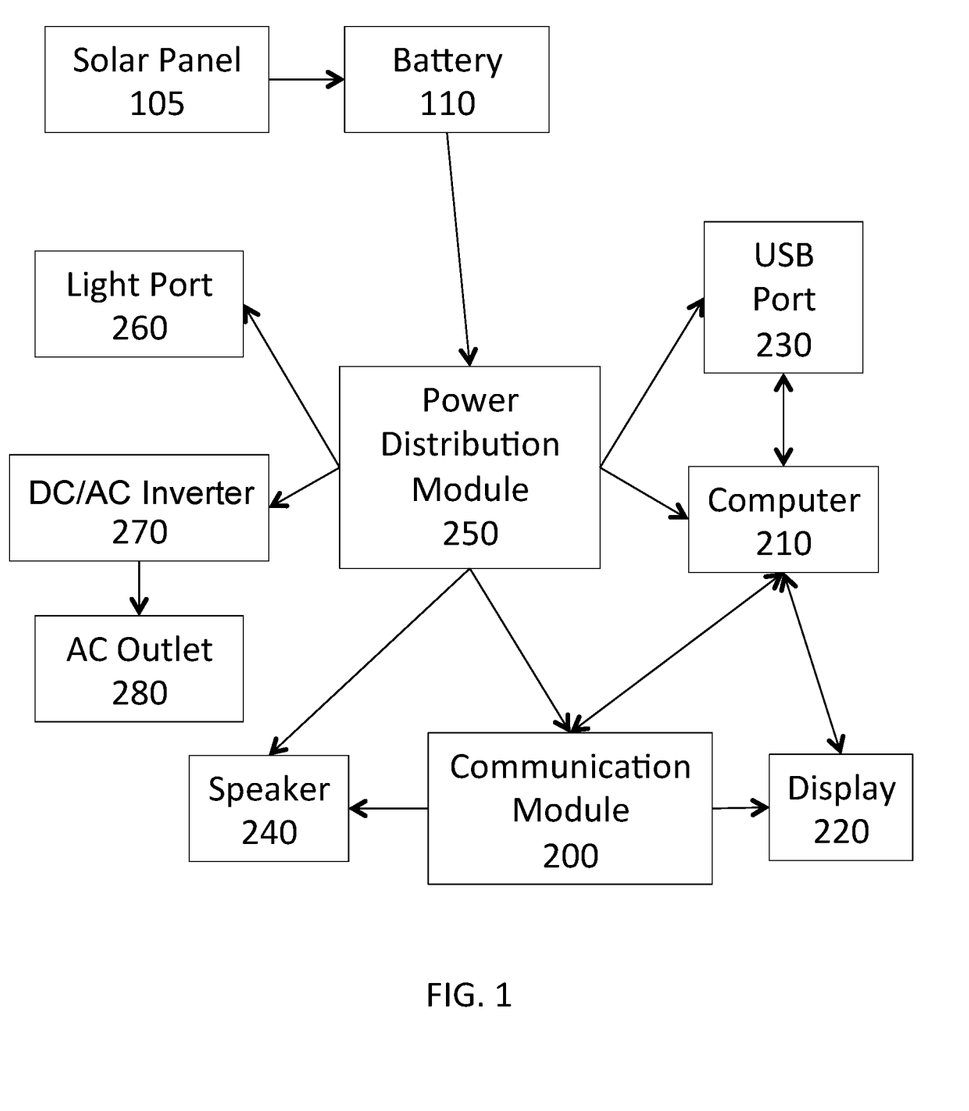
FIG. 1 provides a representation of components and their connectivity of a device according to an aspect of the disclosure.

With reference to FIG. 1, the components of a device according to an embodiment of the invention are shown. Solar panel 105 provides electricity to battery 110. Battery 110 provides power to power distribution module 250. Power distribution module 250 provides power to the various components shown in the figure—light port 260, DC/AC inverter 270 (which in turn provides power to AC outlet 280), USB port 230, computer 210, speaker 240, communications module 200, and display 220. The various components also interface, such as the communication module 200 with computer 210 and display 220. A variety of other connections not shown in the Figure are also possible, such as the speaker 240 with computer 210 and/or USB port 230, and such as communication module 200 with USB port 230.

Figure 2:
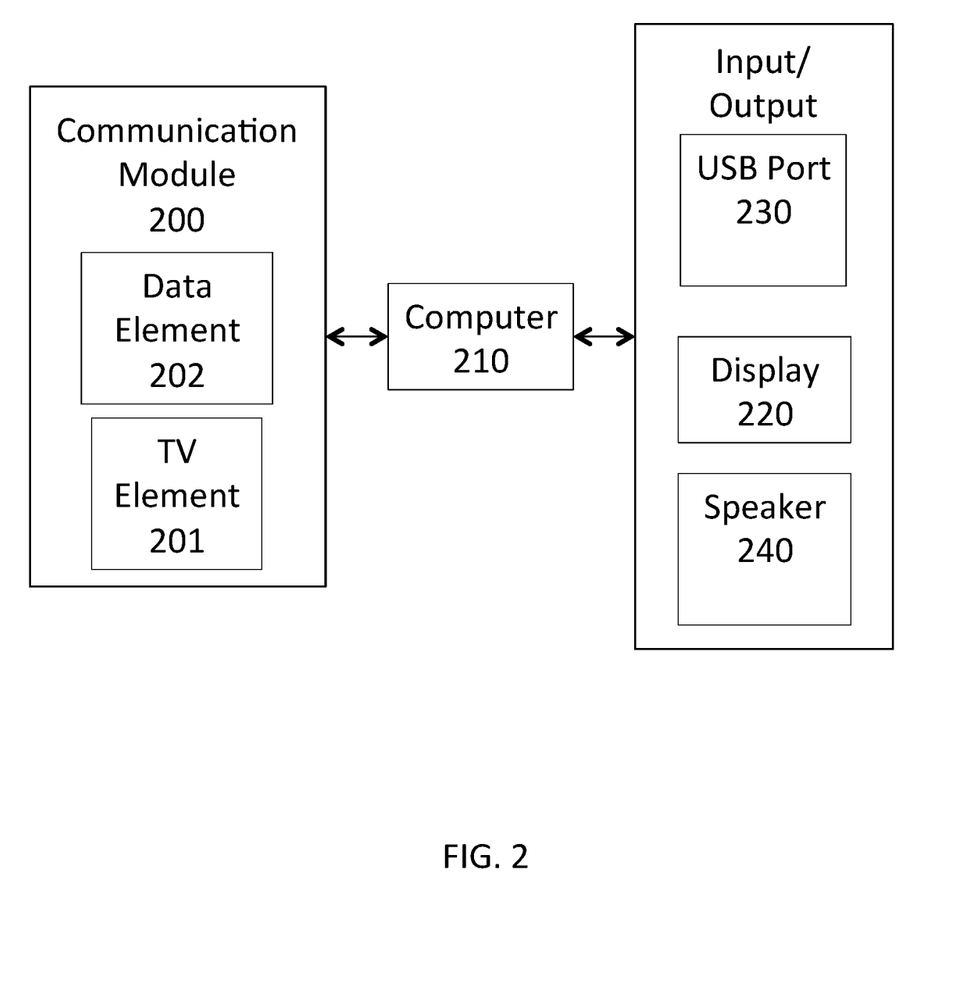
FIG. 2 provides a representation of input/output and communications of a device according to an aspect of the disclosure.

With reference to FIG. 2, input and output options are shown for a device according to an embodiment of the invention. Computer 210 interfaces with communication module 200, and communication module 200 comprises data element 202 and TV element 201. Information from communication module 200 can be passed to computer 210 for output on an I/O device such as display 220, or speaker 240, or USB port 230, or some combination thereof.

The present invention is very useful for household users who do not have access to electricity or do not have regular supply to electricity. This solar home system is an improvement over the old solar systems through the addition of a touchscreen that provides digital television and internet signal and speakers that provide the audio while maintaining the off-grid nature of the house.

The present invention is also very useful for school teachers and schools, as a school teacher may be able to bring the solar home system into a classroom and display lessons from the internet, WiFi signal, or digital television signal to the students.

The present invention can also be used in the construction and/or farming industry. When carrying out construction or farming activity in a rural area, an electricity supply is often not available, which this system would provide. A solar home system that can display instructions for construction or weather information would be extremely valuable as well, and this can be achieved by this system by connecting it to the Internet.

While specific embodiments of the present invention have been provided, it is to be understood that these embodiments are for illustration purposes and not limiting. Many additional similar variations will become apparent in the future.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

In the present disclosure, numerous specific details are provided, including the modules, components and method, to provide a thorough understanding of the embodiments of the invention. The reader will readily be able to recognize, however, that the invention can be practiced without one or more specific details. This description is not exhaustive, however, as some of the more well-known details of certain parts are common and not shown here.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

The examples that are provided here are for exemplification and illustration only, and are not intended to be limiting.

Figure 3:
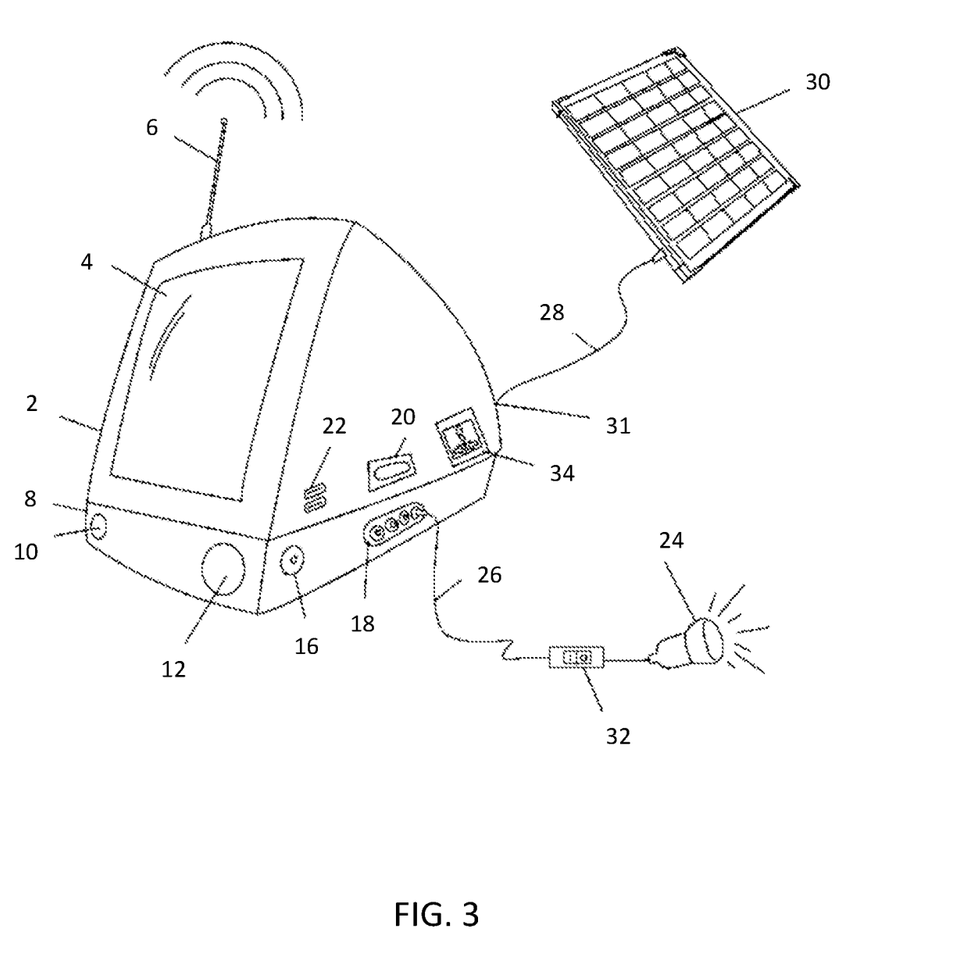
FIG. 3 provides a drawing of an embodiment of the disclosed device.
Figure 4:
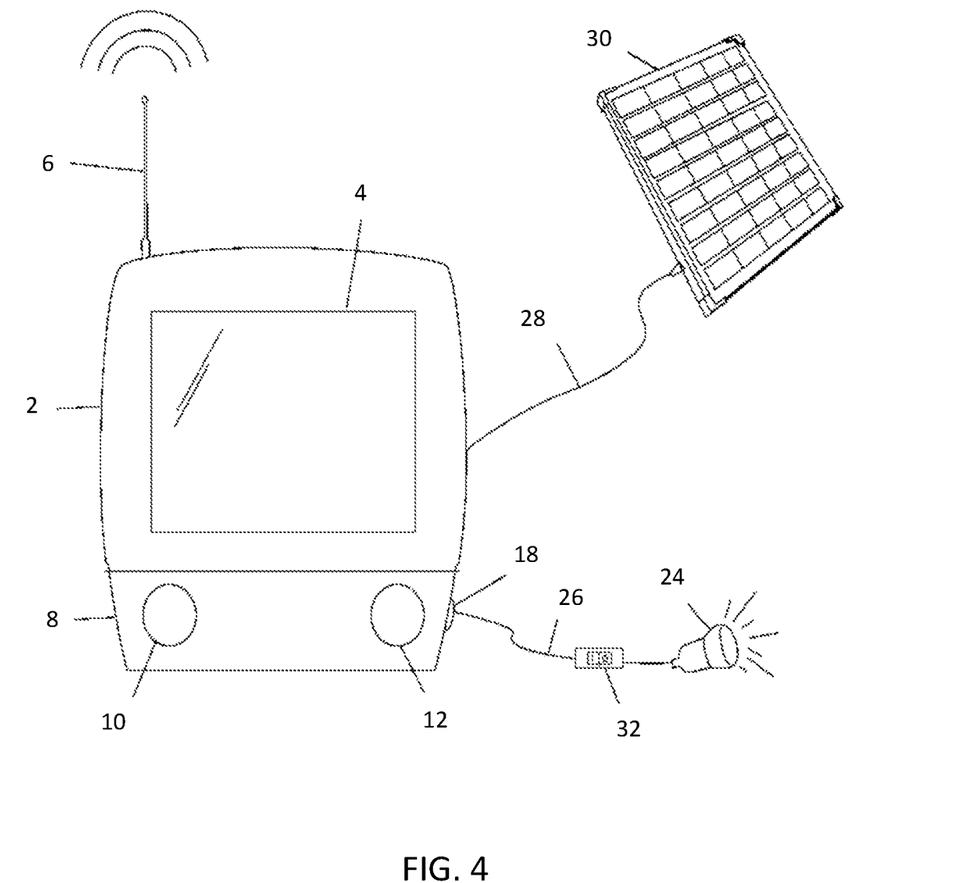
FIG. 4 provides a drawing of an embodiment of the disclosed device.

FIGS. 3 and 4 show the front and back views of an example solar home system. It will be appreciated that the physical design of the devices shown in the figures is merely for ease in illustrating the components and is not intended to be limiting. Physical device designs (e.g., the housing shape and design, and the orientation of the components) may vary considerably.

As shown in FIGS. 3 and 4, 30 are the solar panels that generate the electrical current by absorbing photons from the sunlight. The current is then transferred to the battery inside the solar home system through a cable 28 connected to the solar panels. The battery will receive and store the electrical current from the solar panel.

A motherboard will control the charge from the solar panel 30 and it will also provide information to the charge indicator 20 placed on the outer part of the solar home system. The motherboard will also provide DC current to the 4 light ports 18 and 2 USB ports 22. The motherboard will also control the on/off switch 16 of the solar home system and the on/off 16 switch of the inverter, and will provide current to the inverter so that it can be converted into AC current.

As shown in FIG. 3, four light ports 18 are placed outside of the solar home system that will provide plugs for the light cables that are connected to the light bulbs. Two Universal Serial Bus (USB) ports 22 are provided outside of the solar home system. When the solar home system is turned on, a 5V current will be provided through the USB ports in order to charge cell phones, tablets and other electronic devices. 34 is a AC universal socket which will allow any type of electronic device to be connected with the solar home system, as long as the device is compatible with the voltage of the inverter which is 110-240V.

Also shown in FIGS. 3 and 4, is an antenna 6, which is connected to the solar home system through the motherboard of the touchscreen. It captures digital TV signal, and allows the computer behind the touchscreen to process this signal. The speakers 10 and 12 are connected directly to the computer of the touchscreen and project audio noise signals. The speakers 10 and 12 are placed inside the solar home system and are powered by the DC power of the battery.

As shown in FIG. 3, an on/off 16 switch placed on the outer part of the solar home system will allow the user to turn the solar home system on and off. Once the solar home system is turned on, it will indicate to the motherboard that current can be taken from the battery and dispersed to the USB ports 22, lights, USB ports, inverter or touchscreen 4.

As shown in FIGS. 3 and 4, LED light bulbs 24 are placed on long electrical cables 26, which have switches on them. The cables 26 plug into the solar home system and receive current to power the light bulbs 24. The touchscreen 4 is at the front of the solar home system and is powered by DC current from the battery. The touchscreen 4 and motherboard utilize a software technology, such as Android or Apple technology, depending on the computer to be installed. The built-in computer behind the touchscreen will contain a digital TV signal chip, which will allow the touchscreen to display signal from the digital television network. The computer behind the touchscreen will also contain a SIM card slot, which will allow a SIM card from any wireless carrier to be placed inside the solar home system. Once the SIM card is placed inside the computer behind the touchscreen 4, it will display information from the wireless network such as phone calls, text messages and Internet. The computer behind the touchscreen will be engineered to receive either 3G, 4G, or LTE wireless technology, or any other wireless technology that may be deemed necessary. The computer behind the touchscreen may also contain a Wifi chip, a Bluetooth chip or another radio chip, so that the touchscreen may display internet services from a radio signal.

The device contains a DVB-T2 Chip as well as a TV decoder chip for subscription services like GoTV or any other company that provides Television channels to users at cost of subscription.

An inverter is also inside the solar home system. This inverter transforms the DC electricity stored in the battery into standard household power. There is a charge indicator 20 on the outer face of the solar home system which shows the user how much energy is stored in the battery. The charge indicator 20 is connected directly to the motherboard of the solar home system which is able to determine the charge of the battery. The main body 2 holds all the components together and has a solar connector 31 for the solar panel 30 to connect the main body 2.

The user will use this invention by first installing it in the house. The solar panels will be placed either on top of the household or nearby such that they get direct sunlight throughout the entire day. After placing the solar panels in an optimal position, the user will connect the cable of the solar panel 30 to the main body 2 through the solar panel input port 31. The internal battery will then begin charging and the solar home system is ready for use. The light 24 will also need to be installed in the house in places where the user needs light. The light cables will be placed so that the user can reach the on/off switch 32 of the light cables The motherboard of the solar home system distributes DC power to the light ports, USB ports, speakers, touchscreen and inverter. The inverter generates AC electricity for electrical devices. Through touchscreen use, the user can start the television and internet services in the household.

The invention claimed is:

1. A solar home system comprising:
   at least one solar panel;
   a rechargeable battery in electrical communication with the at least one solar panel;
   a power distribution module in electrical communication with the rechargeable battery;
   a touchscreen-enabled computing device, in electrical communication with the power distribution module, and having at least a specially programmed processor, a memory module, a storage module, and a wireless network module;
   a communications module, in electrical communication with the power distribution module and in operational communication with the touchscreen-enabled computing device, and comprising a data element and a TV element;
   a one or more powered outlet in electrical communication with the power distribution module; and
   a one or more I/O port in electrical communication with the power distribution module and in operational communication with the touchscreen-enabled computing device;
   wherein, the data element of the communications module is configured to receive and transmit data via a wireless data network, and the battery and the power distribution module are configured to be turned off remotely when a signal is sent to the solar home system via the data element.

2. The solar home system of claim 1 further comprising a one or more light source in electrical communication with the power distribution module and wherein the one or more light source is a light bulb.

3. The solar home system of claim 1 wherein a housing of the solar home system comprises a solar connector disposed on an outside surface of the housing for coupling the at least one solar panel to the housing via a cable.

4. The solar home system of claim 1, wherein the communications module comprises an integrated digital TV signal decoder.

5. The solar home system of claim 1, wherein the communications module is configured to interface with a mobile digital TV signal decoder.

6. The solar home system of claim 1, wherein the communications module comprises an integrated digital TV signal decoder, and wherein the data element is configured to access the Internet via a mobile data network.

7. The solar home system of claim 1, wherein the touchscreen-enabled computing device is configured to receive user input and transfer the user input to the communications module.

8. The solar home system of claim 1, wherein the touchscreen-enabled computing device is configured to display images received from the USB port when a device is interfaced with the USB port.

9. The solar home system of claim 1, wherein the power distribution module comprises a motherboard.

10. The solar home system of claim 1, wherein the power distribution module comprises a motherboard, the motherboard comprising a processor and a memory coupled to the processor, the memory comprising program instructions configured to instruct the processor to manage power distribution by the power distribution module.

11. The solar home system of claim 1, wherein the touchscreen-enabled computing device is configured to receive user input and transfer the user input to the communications module, and wherein the communications module is configured to transmit the user input via the data network to an Internet host.

12. The solar home system of claim 1, further comprising a camera for taking photos and videos of a user, wherein the communications module is configured to interface with the camera and provide video teleconferencing.

13. The solar home system of claim 1, further comprising an external antenna connected to the communications module and configured to amplify the signal received by the digital TV signal decoder.

14. The solar home system of claim 1, wherein the communications module comprises an integrated digital TV signal decoder, and wherein the touchscreen-enabled computing device is configured to display a TV signal received by the TV signal decoder.

15. The solar home system of claim 1, further comprising a security feature to disable the solar home system, wherein the battery and the power distribution module are configured to be turned off remotely when a signal is sent to the solar home system via the data element.

16. The solar home system of claim 1 further comprising a DC/AC inverter configured to supply AC to an integrated outlet.

* * * * *